(12) United States Patent
Rupp et al.

(10) Patent No.: US 7,630,944 B2
(45) Date of Patent: Dec. 8, 2009

(54) METHOD FOR CONSENSUS DECISION MAKING IN A DISTRIBUTED SYSTEM

(75) Inventors: Bradley Rupp, Riverton, UT (US);
Ryan Okelberry, Provo, UT (US);
Robert Wipful, Draper, UT (US);
Richard Jones, Elk Ridge, UT (US)

(73) Assignee: Novell, Inc., Provo, UT (US)

( * ) Notice: Subject to any disclaimer, the term of this patent is extended or adjusted under 35 U.S.C. 154(b) by 518 days.

(21) Appl. No.: 11/463,368

(22) Filed: Aug. 9, 2006

(65) Prior Publication Data

US 2007/0233626 A1 Oct. 4, 2007

Related U.S. Application Data

(60) Provisional application No. 60/783,779, filed on Mar. 17, 2006.

(51) Int. Cl.
*G06E 1/00* (2006.01)
*G06E 3/00* (2006.01)
*G06F 15/18* (2006.01)
*G06G 7/00* (2006.01)

(52) U.S. Cl. .................................................. 706/20
(58) Field of Classification Search .................. 706/20
See application file for complete search history.

(56) References Cited

U.S. PATENT DOCUMENTS 5,844,817 A * 12/1998 Lobley et al. .................. 703/2
6,151,565 A * 11/2000 Lobley et al. .................. 703/2
6,330,605 B1   12/2001 Christensen et al.
7,257,566 B2 *  8/2007 Danielson et al. ............ 706/52
2002/0103695 A1 * 8/2002 Urken et al. .................. 705/12

OTHER PUBLICATIONS

Strong threads of learning-knowledge transfer within communities of practice Rouser, K.; Dorsey, A.; Engineering Management Conference, 2003. IEMC '03. Managing Technologically Driven Organizations: The Human Side of Innovation and Change Nov. 2-4, 2003 pp. 141-145 Digital Object Identifier 10.1109/IEMC.2003. 1252248.*
Intelligent information fusion approach in cooperative multiagent systems Shaban, K.; Basir, O.A.; Kamel, M.; Hassanein, K.; World Automation Congress, 2002. Proceedings of the 5th Biannual vol. 13, Jun. 9-13, 2002 pp. 429-434 Digital Object Identifier 10.1109/WAC. 2002.1049580.*
Improving multicriteria group decision making with automated decision guidance Limayem, M.; Chelbi, A.; Systems, Man, and Cybernetics, 1997. 'Computational Cybernetics and Simulation'., 1997 IEEE International Conference on vol. 2, Oct. 12-15, 1997 pp. 1890-1895 vol. 2 Digital Objecty Identifier 10.1109/ICSMC.1997. 638322.*
Leslie Lamport et al., "The Byzantine Generals Problem", ACM Transactions on Programming Languages and Systems, vol. 4, No. 3, Jul. 1982, pp. 382-401.
Ryan Okelberry et al., "BCC 1.1 Auto-Failover Design" Aug. 30, 2005, v0.3, 11 pages.

* cited by examiner

*Primary Examiner*—Michael B Holmes
(74) *Attorney, Agent, or Firm*—Haynes and Boone, LLP

(57) ABSTRACT

A method for consensus decision making in a distributed system. Upon the detection of a system parameter change, the method specifies the communication of decision premises from one node to another node in the system. Consensus decision premises are determined by evaluating the various node premises. Each node then executes a choice function, allowing the system as a whole to respond to the system parameter change in either a centralized, decentralized, or independently coordinated fashion.

17 Claims, 2 Drawing Sheets

METHOD FOR CONSENSUS DECISION MAKING IN A DISTRIBUTED SYSTEM

CROSS-REFERENCE

This patent claims the benefit of U.S. Ser. No. 60/783,779 filed Mar. 17, 2006, the contents of which are hereby incorporated by reference. This patent is also related to U.S. Patent Publication No. 2005/0268154 and U.S. patent Ser. No. 10/213,651, both of which are hereby incorporated by reference.

FIELD

The invention relates generally to inter-connected computers and, more particularly, to a system and method for consensus decision making amongst distributed computing facilities.

BACKGROUND

A distributed computing system is a group of processing units—frequently called nodes—which work together to present a unified system to a user. These systems can range from relatively small and simple—such as multi-component single systems—to world-wide and complex, such as some grid computing systems. These systems are usually deployed to improve the speed and/or availability of computing services over that provided by a single processing unit alone. Alternatively, distributed computing systems can be used to achieve desired levels of speed and availability within cost constraints.

There are different types of decision making functions within a distributed computing system, but they can generally be categorized as one of two types—either centralized or decentralized. Centralized decision making functions have a designated center point by which and through which decisions for the entire system are made. However, centralized decision making procedures have the drawback that it is difficult for distributed system to deal with the loss of the node which implements the decision making function.

A response is to decentralize the decision making functions—allow more than one node to coordinate activity. Simple implementations of this idea provide for redundant coordinating nodes. Various routines have been developed to allow a group of nodes to cooperate for the purpose of selecting a new decision making node. Other independent decision systems build decision models into each node, allowing each node to come to its own best decision about what to do.

In practice, decentralized decision making functions have significant drawbacks. The first problem is that systems which use decentralized decision making are typically harder to build, harder to debug, and harder to employ. The redundancy in hardware and software required by this approach can reduce system performance and raise system costs. Further, decentralized systems are susceptible to inconsistent decisions between nodes due to differences in information. For example, inconsistent decisions are a common problem in routers. Since each node presumably possesses a valid routing table, the routing tables must be consistent to achieve the desired result. However, changing circumstances can lead to local routing table modifications; these modifications can lead to inconsistent decisions—"routing loops"—which forward packets in an endless circle. Routing loops have historically plagued routing, and their avoidance is a major design goal of routing protocols. Similar issues arise in other decentralized decision making systems.

SUMMARY

In one embodiment, a method is provided for consensus decision making in a distributed system. The method includes communicating a premises $p_a$ from a node a to a node b and communicating a premises $p_b$ from node b to node a. A consensus premises $p_{consensus}$ is then determined and a choice function is executed by nodes a and b.

In another embodiment, a method is provided for consensus decision making in a distributed system. The method includes communicating a premise $p_a$ from a node a to a node b and communicating a premise $p_b$ from the node b to the node a. A consensus premise is determined based on the premises $p_a$ and $p_b$ and a choice function is executed by nodes a and b using the consensus premise.

In another embodiment, a system for consensus decision making in a distributed environment is provided. The system includes a plurality of nodes including node a and node b, and a network between nodes a and b, the network comprising interconnects. The nodes a and b each includes a module for communicating premises to the plurality of nodes, a module for determining a consensus premise, and a module embodying a choice function.

In another embodiment, a system for consensus decision making in a distributed system is provided. The system includes a plurality of nodes and means for communicating premises between at least two nodes. The system also includes means for determining consensus premises and means for executing a choice function responsive to the consensus premises.

In another embodiment, a computer implemented method is provided for use by at least one cluster connected to a plurality of other clusters. The computer implemented method is stored as a computer program on a storage medium of the one cluster. The method includes instructions for receiving an indication that at least one of the other clusters has a health issue and creating a health table indicating a health condition for the other clusters. The method also includes instructions for receiving health tables from the other clusters and determining a cluster master from the created and received health tables for dealing with the health issue.

DETAILED DESCRIPTION

To better illustrate the advantages and features of the invention, a particular description of several embodiments will be provided with reference to the attached drawings. These drawings, and other embodiments described herein, only illustrate selected aspects of the invention and do not limit the invention's scope. Further, despite reference to specific features illustrated in the example embodiments, it will nevertheless be understood that these features are not essential to all embodiments and no limitation of the scope of the invention is thereby intended. Any alterations and further modifications in the described embodiments, and any further applications of the principles of the invention as described herein are contemplated as would normally occur to one skilled in the art. Furthermore, some items are shown in a simplified form, and inherently include components that are well known in the art. Further still, some items are illustrated as being in direct connection for the sake of simplicity and clarity. Nevertheless, it is understood that such illustration does not preclude the existence of intermediate components or nodes not otherwise illustrated.

Figure 1:
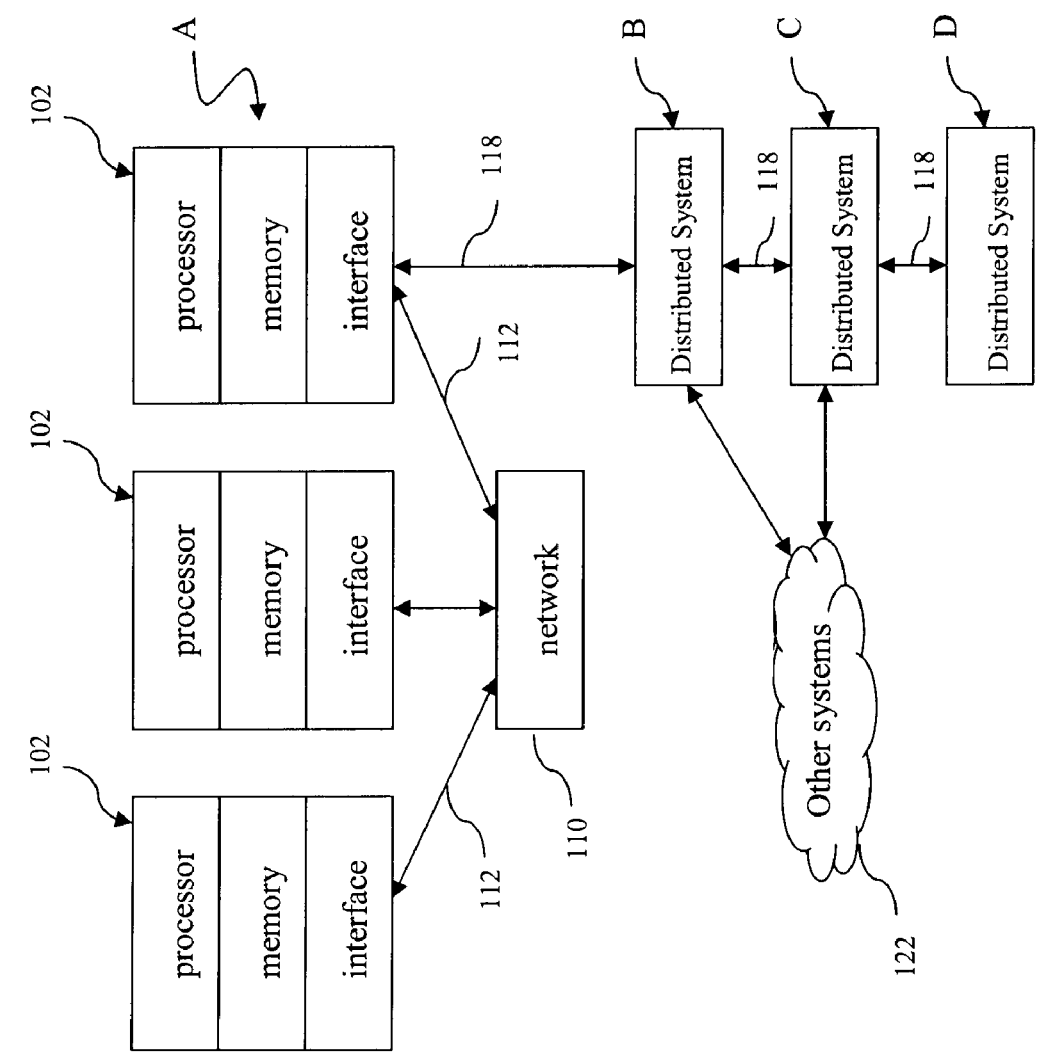
FIG. 1 is a diagram showing a system which could benefit through the use of one or more embodiments of the invention.

Referring to FIG. 1, a distributed system that can benefit from one or more embodiments of the present invention is generally referenced by the letter "A". In this embodiment, the system A includes several nodes 102. The size and composition of the nodes can vary widely. One embodiment uses integrated circuits as processing nodes; another embodiment uses separate computer processes or threads. A third embodiment uses different computers as processing nodes. These computers can be of various types, including, but not limited to, servers, workstations, diskless computers, laptops, multiprocessors, mainframes, so-called "network computers" or "lean clients," databases, personal digital assistants, and/or other computers. These nodes can be similar in function or may include one or more special-purpose nodes tailored, by special-purpose hardware and/or software, to perform particular tasks more efficiently than general-purpose nodes. These special-purpose nodes may include I/O systems, such as printers, process controllers, sensors, numerically controlled manufacturing or rapid prototyping devices, robots, other data or control ports, or interfaces with outside systems. Another embodiment uses clusters, clusters-of-clusters, or other distributed systems as nodes. In general, any device which is capable of performing a computation, responding to a computation, or generating data for a computation may participate as a node. However, not all nodes need to participate in the decision making process described herein.

For the system 'A' and each node 102 in the system, a data store or stores may be used. In the example shown in FIG. 1, each node 102 includes a data store, although other embodiments may not be so configured. In different embodiments, a data store could hold a working set of data, system information, programs, or any other pertinent data. Should one or more data stores be used, they may be implemented in any means known in the art, including, but not limited to, relational, object, or other databases, LDAP stores or other directories, XML documents, or other files in a file system. A data store may involve storage in some sort of medium, such as a magnetic disk, optical disk, flash memory, or magnetic storage. It could also be implemented as an arrangement of transistors in a chip, or in some other chemical or mechanical form. However, a data store is not necessary to practice the invention. For example, a "thin client" may only participate as a node but only provide processing capacity; a printer could participate as a node but only provide a physical output; and a sensor could participate as a node but only provide a data source.

Each of the nodes 102 further includes a processor and an interface. The processor, which may be implemented as a multiple-processor system, is used to perform instructions or operations, such as those discussed in greater detail below. The interface is used to connect to external devices and/or networks, and may include various user interfaces.

The nodes 102 communicate through a network 110 using interconnects 112. Suitable interconnects 112 may encompass one or more types of connections, such as IPC channels, wireless, wired, or optical links. These interconnects may be realized using twisted pair, coaxial, or optical fiber cables, telephone lines, satellites, microwave relays, modulated AC power lines, and/or other data transmission known to those of skill in the art. They may use any communication protocol and bus structure, including, but not limited to, TCP/IP, IPX/SPX, Infiniband, HyperTransport, SCSI, parallel or serial busses, USB connections, Scalable Coherent Interface (LAMP) interconnects, serial express (SciLite), asynchronous transfer mode, HiPPI, Super HiPPI, FibreChannel, iSCSI, Ethernet, Myrinet, Tandem ServerNet, and SerialBus (IEEE 10 1394/"FireWire") interconnects. In general, any connection capable of transmitting information between nodes may be used to form the network. Further, embodiments may mix different types of nodes and network connections freely. The network 110 may include, as necessary, software or hardware for routing, switching, transport, and other networking functions.

Those skilled in the art will appreciate that the systems described in FIG. 1 puts no spatial or geographical restrictions on the network or node locations. The nodes may be adjacent, such as on a single silicon substrate, printed circuit board or backplane, or could be in different cities around the world. The characteristics of each distributed system can be tailored to the problems the system is designed to address.

One or more nodes 102 may also connect the system A to a network 118 of one or more additional distributed systems. For the sake of example, three additional systems B, C, and D are illustrated, which may be similarly or differently configured from each other and from the system A. As a result, the systems A-D form a multi-level distributed system. Each system A-D serves as a node in the larger system illustrated in FIG. 1. The systems A-D may not be well connected. For example, system A may not be connected to system C except through system B.

Just as the systems A-D may encompass smaller distributed systems acting as processing nodes, the systems A-D may individually or collectively participate in additional networks 122. These may include one or more conventional networks such as the Internet and/or a cellular telephone network. These networks may encompass smaller networks and/or be connectable to other networks through a gateway or similar mechanism. Further, the networks 118 and 122 may comprise larger-level distributed systems which might use the systems A-D as a processing node.

Figure 2:
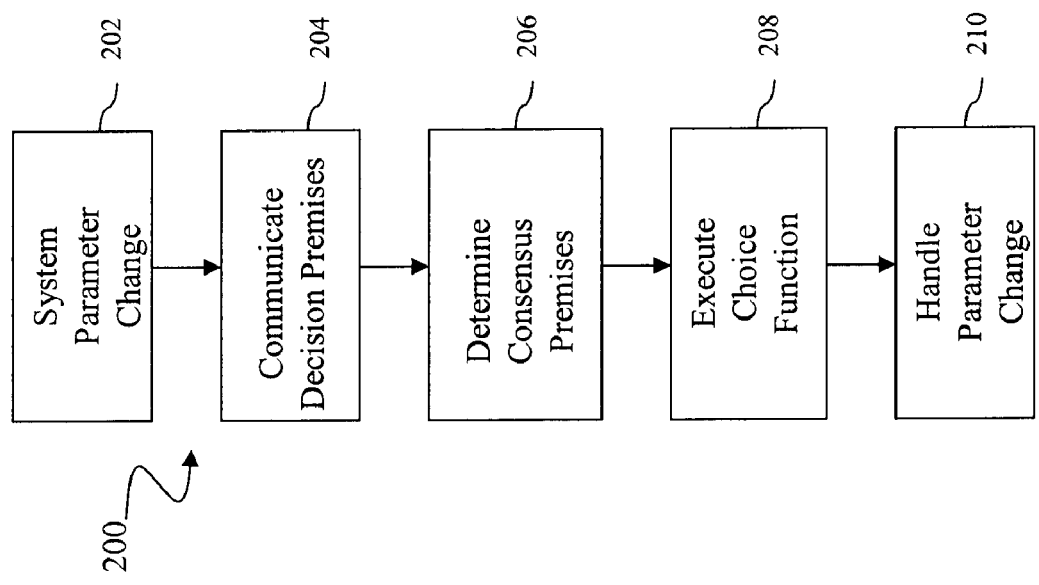
FIG. 2 is a flowchart illustrating a method for consensus decision making according to one embodiment.

Referring now to FIG. 2, a flowchart 200 provides one embodiment of a method for consensus decision making in a distributed system. Reference will be further made, for the sake of example, to the systems A-D of FIG. 1. In this example, they will function as processing nodes within the distributed system described by FIG. 1. As such, they will be referred to as nodes A-D. However, the explanatory use of these systems does not imply a limitation on the method described herein; the same example could be expressed within a smaller, larger, or differently organized distributed system without any loss of generality.

The execution of the method described in FIG. 2 may be accomplished via the use of any computing module. Modules could be implemented in any way known in the art. For example, a module may be implemented in a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Further, the executables of an identified module need not be physically located together, but may comprise disparate instructions stored in different locations which, when joined logically together, comprise the module and achieve the stated purpose for the module.

A "module" of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In one embodiment, the nodes A-D form a distributed system as described in association with FIG. 1. To better illustrate some of the functioning of the invention, node A can only communicate with nodes B and D; node B can only communicate with nodes A, C, and D; node C can only communicate with nodes B and D; and node D can communicate with nodes A, B and C. Despite the use of these illustrative nodes and connections, other embodiments may have any number of nodes which may be connected in any way.

At step 202, there is a system parameter change which affects node B. This change may be the result of various causes. In one embodiment, node B is a cluster system which has a switch or router that fails. In another embodiment, node B receives a new task or instruction which causes a reconfiguration. In a third embodiment, node B is a load-balancing system which has received a new server to add to the pool. In another embodiment, the node B is a RAID controller, and a disk in the RAID array fails. These system parameter changes can be triggered by software or hardware within the system, by an outside operator, or by some device, hardware, or software external to the system. For example, external monitors could include LAN connectivity testing, satellite imagery analysis, and so forth. In general, any new information or conditions which need to be dealt with in the larger distributed system can result in a system parameter change. Due to the many different types of distributed systems and various types of changes which can affect those systems, the specific form and content of a system parameter change message may vary according to the type of parameter change, the type of each network interconnect, the type of each node, and the organization of the system as a whole.

Parameter changes can be distributed explicitly or implicitly to other nodes in the system. One embodiment uses existing network connections to spread knowledge of a system parameter change. Another embodiment has a separate reporting network which can be used to distribute knowledge of parameter changes. A third embodiment uses external reporting mechanisms connected to some or all nodes, such as the external monitors mentioned above. A fourth embodiment uses implicit messaging to convey system parameter changes; the node or network changes its functioning to accommodate the new system parameters, and other nodes receive notice of a change via their successful or unsuccessful attempts to contact the updated nodes in the system. The change in parameters is implied by the changed functioning (including non-functioning) of other nodes. Other embodiments can use a mixture of these methods; for example, assume an embodiment in which a system parameter change is caused by a node n becoming disconnected from the system. A few nodes (nodes j, k, and l) become aware of the change via their unsuccessful attempts to contact node n. The nodes j-l then post a parameter change notice to a shared location. Finally, the rest of the nodes become aware of the change via a broadcast message from the shared location.

Although any sort of system parameter change could start the decision making process, in this example assume that the system parameter change is the result of a node (node B) being removed from the larger system. Further assume that parameter change messages have been received by the other nodes in the system. Therefore, it is desired that any tasks or services being provided by node B be redistributed to the other three nodes A, C, and D, or otherwise dealt with.

Continuing with the example embodiment in FIG. 2, the nodes A, C, and D begin communicating decision premises at step 204. To facilitate the consensus decision making process, the decision premises will be communicated using a collection routine based somewhat on the Byzantine Generals Problem. A general description of the Byzantine Generals Problem is described in Lamport et al., *ACM Transactions on Programming Languages and Systems,* Vol. 4, No. 3, July 1982, pgs. 382-401, which is hereby incorporated by reference. For the present example embodiment, the following assumptions are made and terminology is used with regards to the collection routine:

1. Nodes are generally referred to as "lieutenants" or "commanders." A node can also be a "traitor." The definition of a traitor is a node with incorrect decision premises (e.g. a peer node is down when it really is not).
2. The commander may or may not be a traitor.
3. Lieutenants are always loyal as they never modify a message.
4. A signed message (SM) routine is used to communicate messages. In the present embodiment, no actual cryptographic signing is used. However, other embodiments may use different forms of signing, including cryptographic signing. The SM routine is discussed further below.
5. A message v comprises the decision premises of the commander.
6. The local decision premises (v) do not have to be transmitted to the other peers until an event occurs that causes the table to be modified.

Although specific examples are given with regard to the exemplary embodiment in FIG. 2, decision premises may vary according to the type of each node, the organization of the overall system, and the type of parameter change encountered. For example, an embodiment in a high-availability cluster propagates a health table to the other nodes in the system for use in an auto-failover framework. This health table could resemble the following:

TABLE 1

| Node A's Health Table | | |
|---|---|---|
| Node Name | Connection Status | Node Health |
| A | — | monA = 0:monB = 0 |
| B | Bad | monA = 0:monB = 20 |
| C | Good | monA = 0:monB = 0 |
| D | Good | monA = 0:monB = 0 |

Another embodiment in a load-balancing system communicates load information to other peer nodes for use in rebalancing incoming requests. This load information could resemble the following:

```xml
<?xml version="1.0" encoding="UTF-8"?>
  <loadinfo>
    <average>
      <instant>0.08</instant>
      <delayed minutes="5">0.02</delayed>
      <delayed minutes="10">0.01</delayed>
    </average>
    <uptime days="276" hours="17" minutes="28" seconds="54" />
    <memory>
      <active>436M</active>
      <inactive>1261M</inactive>
      <wired>176M</wired>
      <cache>93M</cache>
      <buf>199M</buf>
      <free>46M</free>
    </memory>
    <swap>
      <total>1024M</total>
      <used>2824K</used>
      <free>1021M</free>
    </swap>
  </loadinfo>
```

Another exemplary embodiment in a system connected by a printed circuit board (PCB)—such as a typical standalone computer—communicates which PCB traces and chip pins are still active. This could be represented by a header and a bit field, in which active bits denote active pins. A further embodiment uses RPC mechanisms to invoke a procedure call on each node. The targets of the RPC call, as well as the values passed by the caller, constitute the decision premises. In all of these examples, the semantic content of the decision premises varies according to the functioning of the overall distributed system. This invention places no limits on what premises may be communicated between nodes, nor on the form of those premises.

Just as the semantic content of the decision premises may vary, so too may the physical representation of the decision premises. One embodiment uses a series of waveforms that can be transmitted across a wire, such as an Ethernet cable or a computer bus. Another embodiment uses electromagnetic modulation—such as radio, optical, or microwave signals—to represent the decision premises. In another embodiment, a higher-level encoding of the information to be transmitted, such as a XML document, is sufficient. The physical representation varies between embodiments and within an embodiment depending upon the requirements imposed by different parts of the system.

Figure 3:
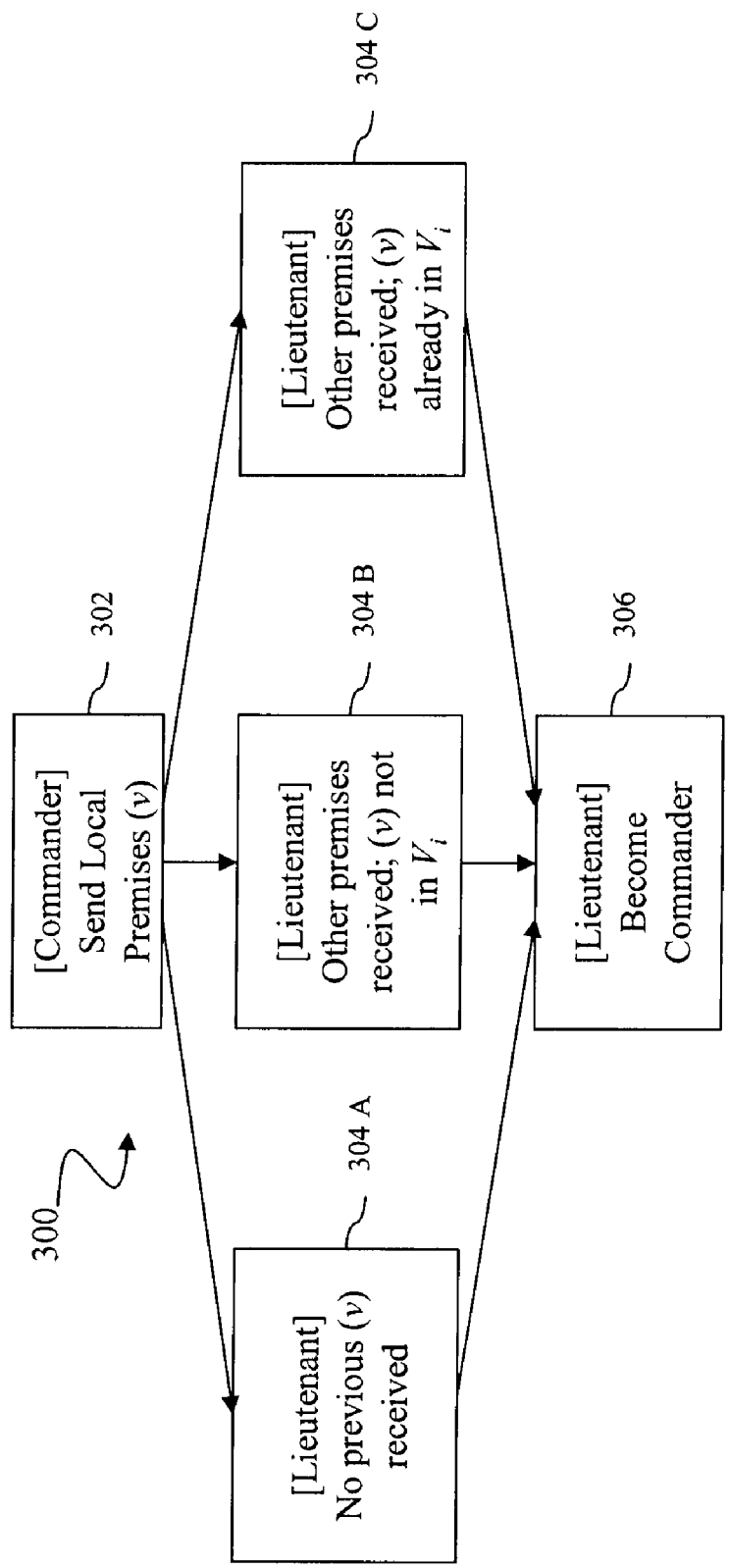
FIG. 3 is a flowchart illustrating a signed message routine according to one embodiment.

Referring to FIG. 3, a flowchart 300 illustrates one embodiment of a signed message (SM) routine. In this routine, each lieutenant i maintains a set Vi, containing the set of local decision premises. Each lieutenant also maintains a set Ni containing a list of peer nodes that it has received v from. Vi is the set of tables received and is not the set of messages that have been received; there may be many different messages with the same table. Initially $V_i = \{$empty set$\}$ and $N_i = \{$empty set$\}$. Before describing the SM routine, it is useful to give a few definitions:

Commander. The commander is the node that is transmitting his local premises.

Lieutenant. The lieutenants are the nodes that are receiving the local premises from the commander.

Neighbor. A neighbor is a node which is a) participating in the decision making function and b) to which the current node has the necessary connection 112.

Beginning with step 302, the commander sends his local decision premises (v) to every neighboring lieutenant i. It is not necessary that the commander be a "lead" or "coordinating" node, or have any special function; as discussed below, each node participating in the decision can have a chance to be the commander. Also as noted above, the semantic content of these premises as well as their representation can vary between embodiments.

Because the commander sends the decision premises (v) to each lieutenant i, steps 304A, 304B, and 304 C (collectively step 304) take place for each lieutenant i. In step 304, the lieutenant evaluates the decision premises which were provided by the commander in step 302. Depending on the premises previously communicated to the lieutenant, one of three actions occurs:

(In 304 A): If Lieutenant i receives a message of the form v:0 from the commander and he has not yet received any v then:
1. He lets $V_i$ equal v;
2. He adds 0 to $N_i$.
3. He sends the table to every other neighboring lieutenant.

(In 304 B): If Lieutenant i receives a message of the form $v:0:j_a \ldots j_c$ and v is not in the set $V_i$ then:
1. He lets $V_i$ equal v;
2. He adds $0:j_a \ldots j_c$ to $N_i$.
3. He sends v to every neighboring lieutenant not in $N_i$.

(In 304 C): If lieutenant i receives a message of the form $v:0:j_a \ldots j_c$ and v is in the set $V_i$ then:
1. He adds $0:j_a \ldots j_c$ to $N_i$.
2. He sends v to every neighboring lieutenant not in N In step 306, the lieutenant i assumes the role of commander, and begins execution with step 302. The neighbors of i therefore become lieutenants in the new premise-sharing round; each participating node assumes the role of commander and transmits its local premises to its neighboring nodes, whether or not its local premises have been modified. When the lieutenant i will receive no more messages, the method in FIG. 3 terminates and the method describes in FIG. 2 resumes. Other collection routines will be evident to those skilled in the art.

In this embodiment, each node can assume the role of commander concurrently, but other embodiments may impose restrictions on the number of nodes which can participate as commanders concurrently. In this embodiment, a full round requires that 8*n messages be sent, where n is the number of peer nodes participating in the decision, regardless of the sequence in which nodes become commanders. Other routines may have a different number of necessary messages.

In cases where faults have effectively partitioned the system into two or more completely separate systems, each subsystem will engage in the method described in FIGS. 2 and 3 separately, as distinct systems. However, if any bidirectional connection (or two oppositely-pointing unidirectional connections) has survived between the surviving partitions, then the method described in FIGS. 2 and 3 will be sufficient to share all relevant premises throughout the system. Unidirectional connections will appropriately allow partial information sharing and coordination.

Returning to step 206 of FIG. 2, each node has sufficient information to determine the consensus premises of the entire system. The method for determining the consensus premises varies between embodiments just as the premises themselves vary between each embodiment. Continuing the example embodiment in a high-availability cluster, such as the one discussed above, each node assembles a consensus health table using the information provided by the other nodes in step 204. This consensus health table could resemble the following:

TABLE 2

Example Consensus Health Tables

| Node A's Health Table | | Node D's Health Table | |
| --- | --- | --- | --- |
| Node Connection/Node Health | | Node Connection/Node Health | |
| A — | monA = 0:monB = 0 | A Good | monD = 0:monB = 0 |
| B Bad | monA = 0:monB = 20 | B Bad | monD = 0:monB = 0 |
| C Good | monA = 0:monB = 0 | C Good | monD = 0:monB = 20 |
| D Good | monA = 0:monB = 0 | D — | monD = 0:monB = 0 |

Continuing the example embodiment in a load-balancing system, consensus load information could resemble the following:

```
<?xml version="1.0" encoding="UTF-8"?>
  <load>
      <node name="A">
            <utilization>
         <cpu>0.06</cpu>
         <memory free="46M" swap="1021M" />
       </utilization>
     </node>
     <node name="B">
            <utilization>
         <cpu>NaN</cpu>
         <memory free="NaN" swap="NaN" />
       </utilization>
     </node>
     <node name="C">
            <utilization>
         <cpu>0.21</cpu>
         <memory free="28M" swap="966M" />
       </utilization>
     </node>
     <node name="D">
       <utilization>
         <cpu>0.13</cpu>
         <memory free="52M" swap="1423M" />
       </utilization>
     </node>
  </load>
```

For another example, assume an embodiment in which premises are represented as bit fields in memory. In this embodiment, step 206 is implemented as logical instructions, like "AND" or "XOR," across multiple bit fields. This creates a composite bit field representation of the various premises. In another embodiment, the premises are stored in a relational database. The database tables and the information therein are the consensus premises for the whole system. In a third embodiment, the premises are communicated as a series of logical rules or statements; a policy engine combines the uses the rules and statements to "solve," or determine, the consensus premises for the whole system. A fourth embodiment compiles the various premises together into an XML document. In general, the type of premises communicated within the system will control the type, the representation, and means used to assemble the consensus premises.

At step 208, a "choice" function is executed on each peer node. The choice function, which is the same for each peer node, uses the consensus premises as input for collective action. In the simple case, the choice function can be used to select a coordinating node for dealing with system parameter changes. If this mode of operation is used, a new "master" node is elected and that master node deals with any existing issues and coordinates work going forward.

However, other modes of operation are possible. The existence of the consensus premises allows the nodes to engage in independent coordination—that is, to harmonize their actions without going through a central controlling or coordinating node.

For example, assume an embodiment integrated into a distributed download system such as BitTorrent. A BitTorrent protocol organizes groups of computers into ad-hoc networks for the purpose of distributing bandwidth demands around the network. The BitTorrent protocol has a designated coordinator—the "tracker"—which monitors which nodes are connected to the network and introduces new nodes into the network. In the case of node failure (e.g., a computer is turned off), the tracker notes the dead node and routes traffic away from the now-disconnected node.

Rather than having a central tracker as currently provided in BitTorrent, the participating nodes could coordinate a swarm download for all peers without having any particular node or nodes dedicated to being trackers. Each node would independently use the choice function to determine its optimal role within the system; however, no node or nodes would need to assume responsibility for the whole system.

Other embodiments can engage in completely decentralized or distributed operation. Further embodiments can use different modes of operation at different times, as appropriate.

Those skilled in the art will note that there are no specific requirements on the choice function; any suitable routine can be used. In one embodiment, the nodes choose a master with the highest number of duplex peer links, handling ties by selecting the node whose name comes first alphabetically. In another embodiment, the choice function reverses those two functions. In a third embodiment, the choice function, chooses the master which has the lowest process number; another embodiment might choose the master which has the highest. Another embodiment uses information from outside the system to make a decision. A further embodiment uses information provided by an outside operator. In the present embodiments, the choice function is the same on all nodes. For those embodiments which do not elect a master, the routines are specific to the functions of the system; however, they all use the consensus premises or some subset thereof—including the empty set—to come to a conclusion as to the proper course of operation.

In the present embodiment, the collection routine solves only a portion of the consensus problem. Another aspect of the consensus problem is the synchronizing of "complete" collection rounds. The execution of the choice routine is determinate on the completion of all outstanding collection rounds. A problem arises when two nodes can assume the role of commander simultaneously, or a commander detects a new system parameter change when a pending collection round has not yet completed. In both of these cases, multiple discrete collection rounds will occur before other collection rounds have completed.

In one embodiment, the problem of "complete" collection round synchronization, and subsequent execution of the choice routine, is performed by the following:

1. Each node maintains a message bucket $B_a$ for each node a
2. Each node maintains a message list $L_a$ for each bucket $B_a$
3. Each node maintains a sequence number CS
4. Each message maintains a value C=a for the node a who is the commander
5. Each message maintains a value I=a for the node a who initiated the collection round
6. Each message maintains a sequence number MS 7. A bucket can be in one of four states:
   (a) Full—For each node a the bucket contains a message with C=a (a message from each node having assumed the role of commander)
   (b) Filling—The bucket does not contains a message with C=a for every node a, but does contain a message
   (c) Filling timeout—The bucket is not full, but a specified timeout has occurred waiting for the bucket to become full.
   (d) Empty—The bucket contains no message.
8. If node a determines a new system parameter change, a constructs a message m with I=a and C=a
   (a) If $B_a$ contains a message with C=a then node a removes any existing message in $L_a$ and places m in $L_a$.
   (b) If node a has no message in bucket $B_a$, node a increments CS and set the m's MS to CS, places the message in $B_a$, and executes the SM routine, having assumed the role of commander.
9. If node a receive a message $m_1$ with I=b
   (a) If bucket $B_b$ is empty, node a places $m_1$ in $B_b$
   (b) If bucket $B_b$ has a message $m_2$
      i. If the sequence number MS of $m_1$ is greater than the MS of $m_2$, node a places $m_1$ in $L_b$
   (c) Node a forwards $m_1$ on to peer nodes
   (d) If $B_b$ does not contain a message with C=a
      i. Node a constructs a message m with I=b and C=a, increments CS, sets m's MS to CS, places m in $B_b$, and executes the SM routine, having assumed the role of commander.
10. If only one bucket B has state full or filling timeout and all other buckets are empty
    (a) The choice routine is executed with the messages in B as the working set
11. If more than one bucket are either full or filling timeout, and none are filling
    (a) A new working set for the choice routine is constructed by selecting a message $m_a$ for each node a from the buckets whose C=a and MS is the greatest.
    (b) The choice routine is executed with the new working set
12. If one or more buckets are filling, node a waits until those buckets' state become full or filling timeout
13. After having executed the choice routine
    (a) Node a empties all buckets
    (b) For each $L_b$, node a selects the message m from $L_b$ with the smallest MS, and proceeds as having received message m from node b.

The routine above outlines a solution that prevents a node from having more than one outstanding collection round as the initiator, while allowing for multiple nodes to initiate a collection round at the same time. At some point, all outstanding collection rounds will become "complete," allowing each node to execute the choice routine with the same working set. Other collection routines and round synchronization approaches applicable to the Byzantine Generals Problem will be apparent to those skilled in the art.

At step 210, the system handles the system parameter change. This can be done in various ways. In an embodiment in which a master node is chosen via the choice function, the master node could direct the response to the parameter change. For example, continuing the example embodiment in which one node of a high-availability cluster has gone down, the choice function provides for a new master node. The new master migrates resources to other nodes or takes over the tasks and services provided by the down node. The master node may also deal with the health issues by going into a different mode of operation for the entire node of nodes. In some embodiments, the master will direct other nodes that are not directly connected through remote means, such as by proxy.

Alternatively, another embodiment uses the output of the choice function to respond to the system parameter change. For example, in an embodiment in which each node is a server in a server farm, the output of the choice function could be the new expected utilization for each node. As a result of the choice function output, the servers can increase or decrease the ancillary tasks they are charged with handling to meet the new expected load.

In a third embodiment, there is no separate "handling" of the parameter change beyond the execution of the choice function. For example, assume an embodiment in which the different nodes of the system are receiving points in a wireless network, such as a cellular or multi-station 802.11b network. The system parameter change is caused by a user moving closer to one receiving station than another. The choice function dictates which receiving station should pay attention to the future commands by the user—and there is no further action other than the ordinary functioning of the network.

In one embodiment, step 210 is accomplished via the creation of a log, noting the time when a certain action was accomplished or when a certain condition was met—the system operation does not actually change. In another embodiment, step 210 involves the calling and the subsequent execution of a function to reconfigure the system—including changing the choice function. For example, a neural "learning" network could modify the choice function after each invocation to achieve more optimal results for future requests. Another embodiment involves returning a message to the individual, system or identity requesting the change, reporting whether the initial request was successful or not. Other embodiments send email, update databases, and invoke web services. Handling a parameter change as in step 210 may involve doing nothing, a single action, or a combination of actions.

As discussed above, the execution of the choice function in step 208 and the optional step of handling the parameter change in step 210 provide a general facility for responding to any system parameter change. Each change can be dealt with in either a completely centralized, completely decentralized, or independently coordinated response.

The present invention can be applied to many different types of distributed systems. One way to describe at least some distributed systems is how they are designed to take advantage of four concepts—specialization, redundancy, isolation, and parallelism. Different distributed systems emphasize these attributes in different ways. For example, most standalone computers today are designed as small-scale distributed systems to benefit from the specialization of different processing units. These processing units—such as the CPU, GPU, other co-processors, and various peripherals—communicate and cooperate via an internal network of high-speed busses to solve computing problems. The computer operating system typically coordinates the use of these components to present a single system image to the user.

Another type of distributed system is the "blade" server. Blade servers put complete computer systems on peripheral cards. The host system contains software and hardware to control and communicate with the systems on the cards. Typical blade servers can host tens to hundreds of processing units within a single system. These processing units can be arranged in different ways—to emphasize redundancy (for example, as a high-availability cluster), parallelism (as a "compute farm"), or security (by isolating different services on different units).

Distributed systems that can benefit from the present invention can also be created logically within one system or over several different physical systems using hardware virtualization or process isolation. Virtualization systems allow multiple operating environments to use the same physical hardware at the same time. Process isolation allows a process to use the same hardware as other processes without intruding upon the other processes' memory space. Each of these operating environments—whether they be processes or virtual machines—can be considered a single computing node; these nodes together provide a distributed system. Just like hardware-based distributed systems, these virtual distributed environments can be used to enhance redundancy, parallelism, or security. Alternatively, these sorts of systems can also be used to increase resource utilization. For example, one hundred lightly-utilized virtual machines could be distributed across ten physical processors; the resulting load on the physical processors would come much closer to full utilization.

Further increases in specialization, redundancy, isolation, and parallelism can be gained by creating multi-level distributed systems. Computing clusters generally consider each physical computer to be a "node," despite the fact, noted above, that there is a typically a small-scale distributed system tying together the components in each physical computer. In similar fashion, n-level distributed systems can be created by using clusters themselves as nodes. These multi-level systems are generally known as "clusters of clusters." It is currently unusual to find clusters of clusters ("multiclusters" or n-level distributed systems) but the widespread deployment of such systems is a simple extrapolation of current trends.

In addition to the differences described above, distributed systems can be organized in several different ways, known as different "architectures." Many alternative architectures have been defined in the art. For example, in a client-server architecture, a "client" node contacts a "server" node for data. The client then manipulates that data and sends changes or results back to the server when necessary. In a three-tier architecture, client intelligence is moved to a middle tier so to reduce the amount of processing necessary at the edge nodes of the system. A more general N-tier architecture forwards messages between different "levels" of the system, allowing the nodes at each level to specialize for certain problems. Tightly coupled, or clustered, architectures typically use a set of highly integrated machines to run processes in parallel, generally controlled by a supervisor machine or process. Peer-to-peer architectures divide all responsibilities among the system nodes—known as peers—and do not use a central node or process to manage resources or coordinate activity.

In practice, the example definitions above are too few to correctly categorize the many distributed architectures that can benefit from the present invention. Some systems use one architecture at one level, and another architecture at a different level. Other systems blend the characteristics of several architectures within a single level. These hybrid systems display one of the great strengths of distributed systems—the tradeoffs and characteristics of distributed systems can be varied to match the characteristics of a problem and the operational parameters required by the environment.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for consensus decision making in a distributed system, the method comprising using at least one processor to perform steps of:
    communicating a premise $p_a$ from a node a to a node b, wherein the premise $p_a$ is representative of a system parameter change of the node a;
    communicating a premise $p_b$ from the node b to the node a;
    determining a consensus premise based on the premises $p_a$ and $p_b$; and
    executing a choice function by nodes a and b using the consensus premise.

2. The method as recited in claim 1 further comprising using at least one processor to perform steps of:
    responding to the system parameter change by at least one of either creating a record, executing a function, calling an external system, modifying an operation parameter of node a, performing a procedure, and effecting a user-specified procedure.

3. The method as recited in claim 1 wherein one of the communicating premises $p_a$ and $p_b$ is executed via a collection routine.

4. The method as recited in claim 3 wherein the collection routine is synchronized.

5. The method as recited in claim 1 wherein one of the communicating premises $P_a$ and $P_b$ is executed via a routine based on the Byzantine Generals Problem.

6. The method as recited in claim 1 wherein one of the communicating premises $p_a$ and $p_b$ is executed via a signed message routine.

7. The method as recited in claim I wherein the nodes a and b operate in at least one of a centralized mode, a decentralized mode, or an independently coordinated mode.

8. A system for consensus decision making in a distributed environment, the system comprising:
    a plurality of nodes including node a and node b, wherein each of the nodes includes at least one processor;
    a network between nodes a and b, the network comprising interconnects; and
    the nodes a and b each comprising:
        a module comprising instructions executable by the at least one processor for communicating a plurality of premises to the plurality of nodes;
        a module comprising instructions executable by the at least one processor for determining a consensus premise; and
        a module comprising instructions executable by the at least one processor for initiating a system parameter change in response to the consensus premise;
    wherein the nodes communicate premises responsive to a system parameter change.

9. The system as recited in claim 8 wherein the nodes communicate premises via a collection routine.

10. The system as recited in claim 9 wherein the collection routine is synchronized.

11. The system as recited in claim 9 wherein the collection routine is based on the Byzantine Generals Problem.

12. The method as recited in claim 9 wherein the communicating premises is done via a signed message routine.

13. The system as recited in claim 9 wherein the system operates in at least one of a centralized mode, a decentralized mode, and an independently coordinated mode.

14. A system for consensus decision making in a distributed system, the system comprising:

a plurality of nodes, each of the nodes comprising a processor;
means for communicating premises between at least two nodes responsive to a system parameter change;
means for determining consensus premises; and
means for executing a choice function responsive to the consensus premises.

15. The system as recited in claim 14 further comprising: means for engaging in a collection round.

16. The system as recited in claim 15 further comprising: at least one of a means for synchronizing a collection round and a means for exchanging signed messages.

17. A computer implemented method for use by at least one cluster connected to a plurality of other clusters, the computer implemented method being stored as a computer program on a storage medium of the one cluster and comprising instructions executable by the computer for:

receiving an indication that at least one of the other clusters has a health issue;
   creating a health table indicating a health condition for the other clusters;
   receiving health tables from the other clusters; and
   designating a cluster master from the created and received health tables, wherein the designated cluster master deals with the health issue.

* * * * *